United States Patent
Sancho-Dominguez et al.

(10) Patent No.: US 8,166,288 B2
(45) Date of Patent: Apr. 24, 2012

(54) MANAGING REQUESTS OF OPERATING SYSTEMS EXECUTING IN VIRTUAL MACHINES

(75) Inventors: Jose A. Sancho-Dominguez, Tomball, TX (US); Louis B. Hobson, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 12/362,598

(22) Filed: Jan. 30, 2009

(65) Prior Publication Data

US 2010/0199062 A1    Aug. 5, 2010

(51) Int. Cl.
G06F 15/177 (2006.01)
G06F 9/00 (2006.01)
G06F 9/455 (2006.01)
(52) U.S. Cl. ..................... 713/2; 713/1; 718/1
(58) Field of Classification Search .......... 713/2
See application file for complete search history.

(56) References Cited

U.S. PATENT DOCUMENTS

| | | | |
|---|---|---|---|
| 7,188,339 B2 | 3/2007 | Qureshi | |
| 7,434,003 B2 | 10/2008 | Oney et al. | |
| 7,814,287 B2 * | 10/2010 | Pratt | 711/163 |
| 7,844,845 B2 * | 11/2010 | Chen et al. | 713/323 |
| 7,937,701 B2 * | 5/2011 | Kinney et al. | 718/1 |
| 2005/0268078 A1 | 12/2005 | Zimmer et al. | |
| 2006/0036791 A1 * | 2/2006 | Jeyasingh et al. | 710/260 |

FOREIGN PATENT DOCUMENTS

| | | |
|---|---|---|
| GB | 2455398 | 6/2009 |
| WO | WO2007005924 | 1/2007 |

OTHER PUBLICATIONS

"Advanced Configuration and Power Interface," Wikipedia, http://en.wikipedia.org/wiki/Advanced_Configuration_and_Power_Interface, pp. 1-4, Dec. 21, 2008.
"BIOS," Wikipedia, http://en.wikipedia.org/wiki/BIOS, pp. 1-6, Dec. 22, 2008.
"Virtual Appliance," Wikipedia, http://en.wikipedia.org/wiki/Virtual_appliance, pp. 1-2, Dec. 21, 2008.
"Hypervisor," Wikipedia, http://en.wikipedia.org/wiki/Virtual_machine_monitor, pp. 1-5, Dec. 22, 2008.

* cited by examiner

*Primary Examiner* — Suresh Suryawanshi

(57) ABSTRACT

A coordinator in a computer system receives a request from one of a plurality of operating systems (that coexist in the computer system) to invoke a service of a management routine in the computer system. The plurality of operating systems execute in respective virtual machines of the computer system. The coordinator processes the received request to invoke the service of the management routine to prevent a conflict from occurring with respect to at least another one of the plurality of operating systems.

15 Claims, 3 Drawing Sheets

MANAGING REQUESTS OF OPERATING SYSTEMS EXECUTING IN VIRTUAL MACHINES

BACKGROUND

To enhance flexibility and performance of computer systems, virtualization can be utilized in which a hardware platform is shared by multiple virtual environments that include corresponding operating systems (sometimes referred to as guest operating systems). The virtual partitions of the shared hardware platform are sometimes referred to as "virtual machines" or "virtual appliances."

When multiple guest operating systems are deployed in a shared platform, conflicts may arise in various requests that may be made by the guest operating systems. For example, the guest operating systems may attempt to invoke power management features, such as by submitting requests to place a computer system into a low power mode, such as a hibernate mode or standby mode. However, conventionally, efficient mechanisms have not been provided to enable proper coordination of these types of power management requests, and conflicts may arise. For example, a first guest operating system may request that the computer system be placed into a low power mode (in which processing power is unavailable for performing computing tasks), while a second guest operating system may still be active and executing computing tasks. If the computer system were to be placed into a low power mode in response to the request from the first guest operating system, then the second guest operating would no longer be able to continue performance of its computing tasks.

BRIEF DESCRIPTION OF THE DRAWINGS

Some embodiments of the invention are described, by way of example, with respect to the following figures.

DETAILED DESCRIPTION

In accordance with some embodiments, in a shared platform in which multiple operating systems coexist, a mechanism is provided to coordinate requests from the multiple operating systems for invoking certain types of services to ensure that conflicts do not arise. The services that can be invoked by the operating systems on the shared platform include power management services and/or other services provided by a basic input/output system (BIOS) routine or other type of management routine. The multiple operating systems are provided in corresponding virtual partitions of the shared platform, where the virtual partitions can be referred to as "virtual machines" or "virtual appliances." In the ensuing discussion, reference is made to "virtual machines"; however, it is contemplated that "virtual machines" are also intended to cover "virtual appliances" or any other type of virtual partition.

Generally, a "virtual machine" refers to some partition or segment (made up of software and hardware) of a physical machine that is provided to virtualize or emulate a physical machine. From the perspective of a user or application, a virtual machine looks just like a physical machine. The operating systems executing in respective virtual machines are also referred to as "guest operating systems."

Generally, the shared platform can be in the form of a computer system, where a "computer system" refers to any system or electronic device that has one or multiple processors on which software code is executable. A BIOS routine refers to code that is run by a computer system to perform various initialization tasks, management tasks (e.g. power management tasks to change power modes of the computer system, hot swap tasks to manage hot insertion or hot removal of peripheral devices while the computer system remains live, thermal management tasks to change the operating state of the computer system in response to temperature events, and so forth). The term "BIOS routine" can refer to one or multiple software modules. Alternatively, some of the management tasks referred to above (e.g., power management tasks, thermal management tasks, hot swap tasks, and so forth) can be managed by another type of management routine that is executable in the computer system.

The multiple operating systems executing in respective virtual machines of the computer system may issue requests (such as power management requests, thermal management requests, hot swap requests, and so forth) that can cause a state of hardware in the computer system to change. Such requests may result in conflicts if not handled properly. In accordance with some embodiments, the mechanism to coordinate requests from the multiple guest operating systems (running in respective virtual machines) of the computer system is provided to avoid conflicts.

Figure 1:
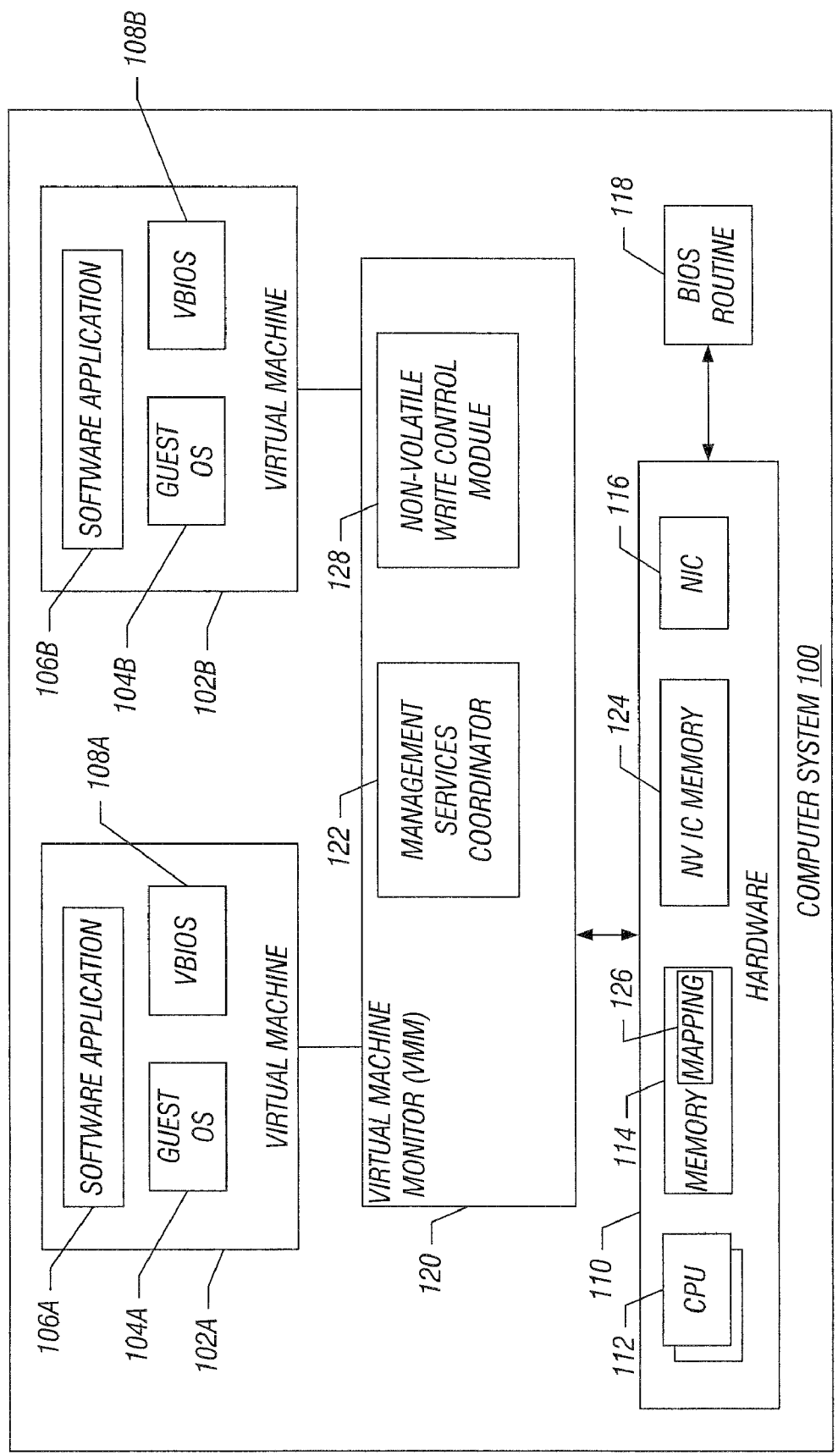
FIG. 1 is a block diagram of an exemplary computer system that incorporates an embodiment of the invention.

FIG. 1 illustrates an exemplary computer system 100 in which multiple virtual machines 102A and 102B are provided. Each virtual machine 102A, 102B has a respective guest operating system 104A, 104B. Each virtual machine also includes respective software applications 106A, 106B. Although two virtual machines are depicted in FIG. 1, note that in alternative embodiments, more than two virtual machines can be present.

It is noted that the guest operating system 104A, 104B running in corresponding virtual machines 102A, 102B can be different types or versions of operating systems, or the same type or same version of an operating system.

In accordance with some embodiments, each virtual machine 102A, 102B also includes a respective virtual BIOS routine 108A, 108B. A guest operating system 104A or 104B desiring to access services of a BIOS would make a call to the respective virtual BIOS routine 108A or 108B (instead of an actual BIOS routine 118 in the computer system 100).

The virtual machines 102A, 102B within the computer system 100 are designed to share physical resources of the computer system 100. In the computer system 100, the physical resources are part of hardware 110, which includes one or more central processing units (CPUs) 112, memory (volatile memory and/or persistent storage, such as disk-based storage) 114, non-volatile integrated circuit (IC) memory 124, a network interface 116, in other resources.

In addition to shared hardware 110, the computer system 100 also includes the BIOS routine 118 whose services can be shared by the multiple guest operating systems 104A, 104B of the system. The BIOS routine 118 includes code that is executable on the CPU(s) 112 of the computer system 100. Alternatively, or additionally, at least one other type of management routine can be provided to provide management services of the computer system 100. The BIOS routine 118 can provide management services, such as power management services, hot swapping services, and thermal management services.

The computer system 100 also includes a VMM 120 that manages the sharing, by the virtual machines 102A, 102B, of the physical resources, including the hardware 110 of the computer system 100. The VMM 120 virtualizes the physical resources, including the hardware 110. Each virtual machine has an associated virtualized hardware that is managed by the VMM 120. The VMM 120 intercepts requests for resources from the operating systems 104A, 104B in the respective virtual machines 102A, 102B, so that proper allocation of the physical resources can be performed. For example, the VMM 120 can manage memory access, input/output (I/O) device access, and CPU scheduling for the virtual machines. Effectively, the VMM 110 provides an interface between the operating system of each virtual machine and the underlying hardware 110 of the computer system 100. The interface provided by the VMM 110 to an operating system of the virtual machine is designed to emulate the interface provided by the actual hardware of the computer system 100.

In accordance with some embodiments, the VMM 120 further includes a management services coordinator 122 for coordinating requests from operating systems for services provided by the BIOS routine 118 (and/or other type of management routine) to avoid conflicts. A virtual machine 102A or 102B desiring to access a service of the BIOS routine 118 calls its respective virtual BIOS routine 108A or 108B. The called virtual BIOS routine performs the request, which is trapped by the VMM 120.

The management services coordinator 122 responds to the trapped requests to determine how the requests are to be handled. For example, if a received request of a particular virtual machine is to enter into a particular power management state, the management services coordinator 122 determines whether or not other virtual machines have requested a similar state. If the management services coordinator 122 determines that the requested power management state is inconsistent with states of other virtual machines, then the management services coordinator 122 would cause the VMM 120 to simulate the requested power-management state for the particular virtual machine. On the other hand, if the management services coordinator 122 determines that the requested power-management state is consistent with states (or requested states) of other virtual machines, then the management services coordinator 122 causes the VMM to call the actual BIOS routine 118 to cause the computer system 100 to enter the requested power-management state.

In a more specific example, the management services coordinator 122 may have received a first request from the guest operating system 104A to place the computer system 100 into a low power mode. The guest operating system 104A calls the virtual BIOS routine 108A to make this request), and the virtual BIOS routine 108A performs this request, which is trapped by the VMM 120 and detected by the management services coordinator 122. The management services coordinator 122 can determine that such request is inconsistent with the needs of the guest operating system 104B, which is still actively executing in the virtual machine 102B and thus has to have access to the processing resources of the computer system 100. When such a conflict is detected, the management services coordinator 122 may cause the VMM 120 to simulate the low power mode for the virtual machine 102A (and does not call the actual BIOS routine 118 to place the computer system 100 into the low power mode).

The computer system 100 can have multiple power modes, including a normal or active power mode and one or more lower power modes in which some or all of the components of the computer system 100 are powered off. The power modes of the computer system 100 can be ACPI (Advanced Configuration and Power Interface) power modes. The current version of ACPI is described in the ACPI Specification, Version 3.0b (October 2006). Transitioning the computer system 100 between different ACPI power modes can be managed by the BIOS routine 118.

More generally, the management services coordinator 122 determines whether a requested service from a particular virtual machine would conflict with other virtual machines. If a conflict will occur, then the management services coordinator 122 will cause the VMM 120 to simulate the requested service on behalf of the particular virtual machine. On the other hand, if no conflict will occur, then the management services coordinator 122 will cause the VMM 120 to call the actual BIOS routine 118 to perform the requested service.

Figure 2:
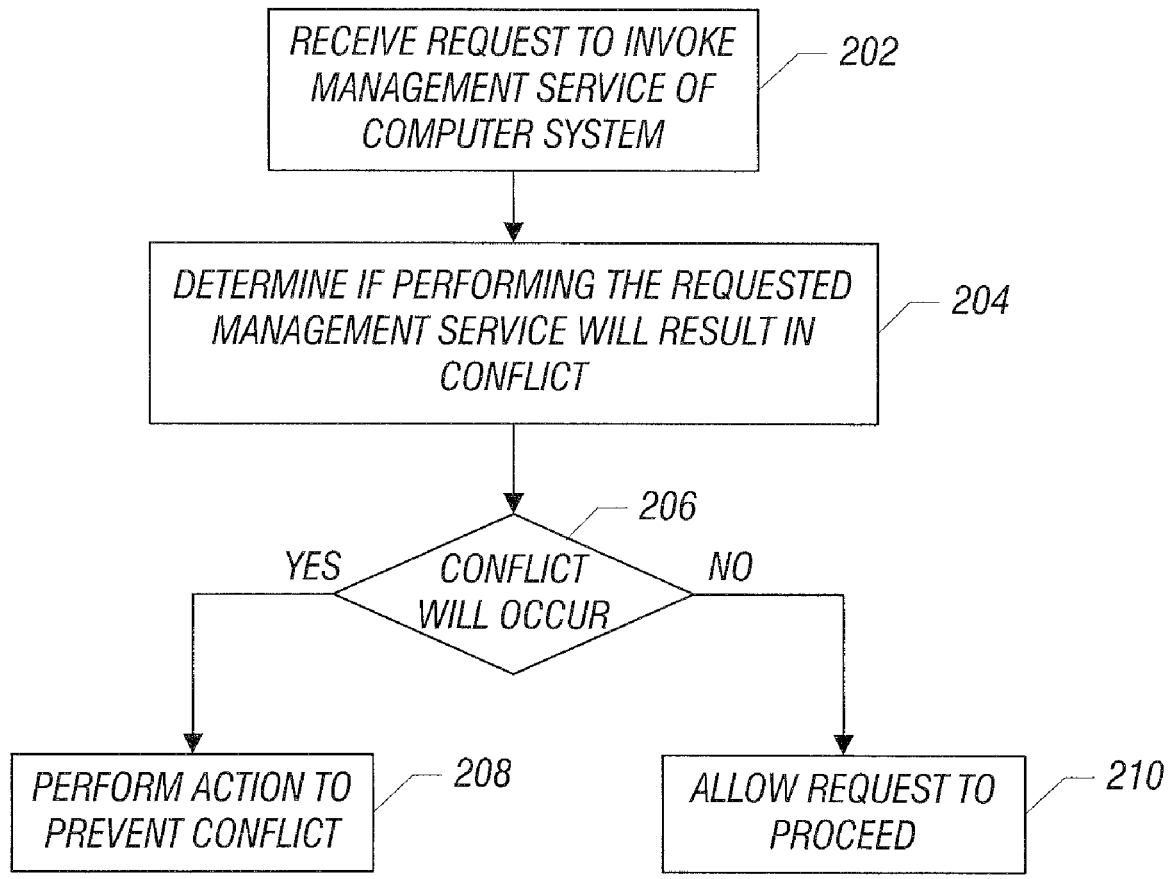
FIG. 2 is a flow diagram of a process of coordinating requests from multiple operating systems on a shared platform, in accordance with an embodiment.

FIG. 2 illustrates a procedure performed by the management services coordinator 122 of FIG. 1. The management services coordinator 122 receives (at 202) a trapped request from a guest operating system to invoke a management service of the computer system 100. The trapped request is a request performed by a virtual BIOS 108A or 108B in the respective virtual machine 102A or 102B that has been trapped by the VMM 120. The received trapped request can be one of many trapped requests received by the management services coordinator 122, or it may be the only trapped request that has been received by the management services coordinator 122.

In response to the received trapped request, the management services coordinator 122 determines (at 204) if performing the requested management service will result in a conflict. For example, the request may be a request to place the computer system 100 into a low power mode. However, the management services coordinator 122 may detect that another guest operating system is actively performing computing tasks in the computer system 100, and thus placing the computer system 100 into a low power mode in response to the request would be inconsistent with the state of such other guest operating system.

If it is determined that a conflict will occur (206), then the management services coordinator 122 performs (at 208) an action to prevent the conflict, such as by simulating the service for the requesting virtual machine (and not calling the actual BIOS routine 118).

On the other hand, if it is determined that a conflict will not occur, then the management services coordinator allows (at 210) the request to be processed by causing the VMM 120 to call the actual BIOS routine 118 to perform the requested service.

In accordance with some embodiments, another feature provided by the VMM 120 of FIG. 1 is the control of updates of the content of the non-volatile memory 124. This control is provided by a non-volatile write control module 128 in the VMM 120. The non-volatile IC memory 124 can be implemented with flash memory, electrically erasable and programmable read-only memory, or any other IC memory (memory made by integrating electronics components onto a common substrate such as a semiconductor substrate) that is designed to maintain its content persistent even if power is removed from the IC memory in the computer system 100.

In certain situations, the content of the non-volatile IC memory 124 (FIG. 1) may have to be updated. In one example, a new version of a BIOS routine (or other management routine that is stored in the non-volatile memory 124) may be available. The update of the content of the non-volatile memory 124 may be requested by one of the guest operating systems 104A, 104B.

An issue associated with the deployment of guest operating systems in virtual machines is that the guest operating systems are not aware of physical addresses in the computer system 100, including physical addresses associated with the non-volatile memory 124. In accordance with some embodiments, a virtual address-to-physical address mapping 126 (FIG. 1) is stored in the memory 114 of the computer system 100 to allow the non-volatile write control module 128 to map virtual addresses in requests received from guest operating systems to physical addresses, including physical addresses of the non-volatile memory 124.

Figure 3:
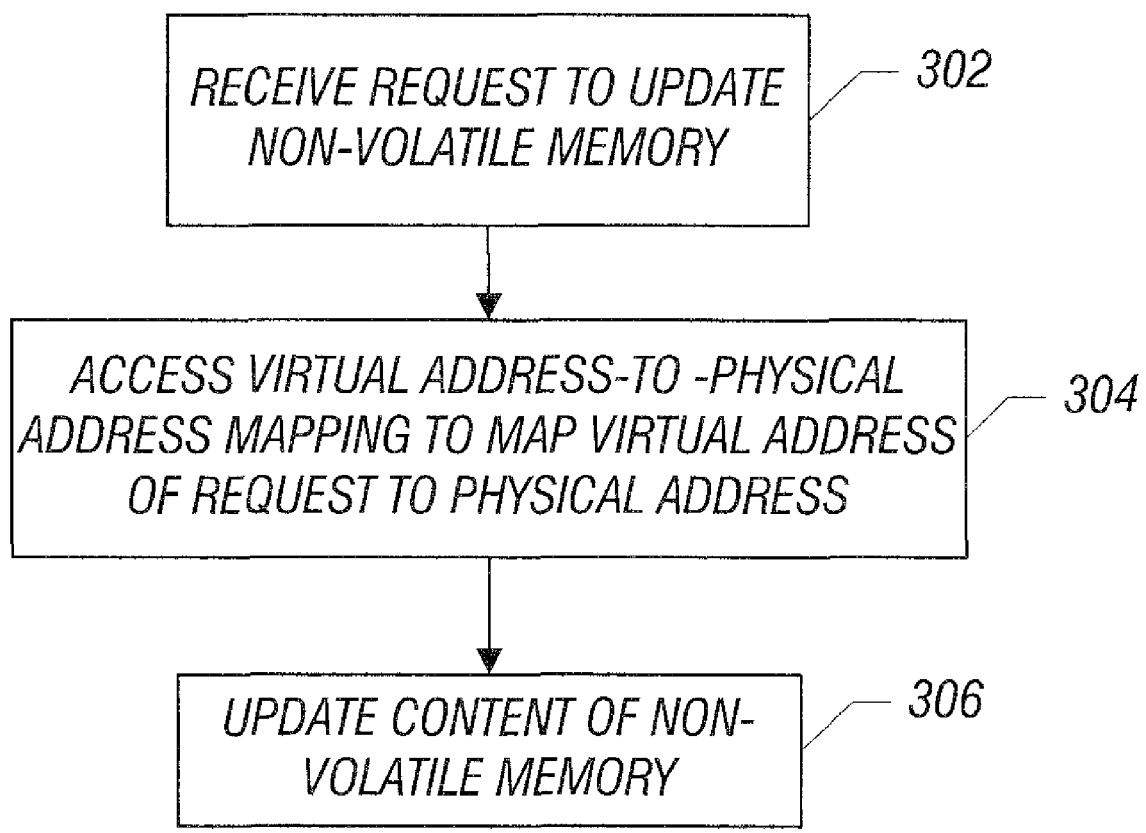
FIG. 3 is a flow diagram of a process that is responsive to a request to update non-volatile memory, in accordance with a further embodiment.

FIG. 3 illustrates a procedure of updating content of the non-volatile memory 124 according to an embodiment. The non-volatile write control module 128 receives (at 302) a request to update the non-volatile memory 124, such as to update a BIOS routine or other management routine. The request is received from a guest operating system, and the request contains at least one virtual address.

The non-volatile write control module 128 accesses (at 304) the virtual address-to-physical address mapping 126 (FIG. 1) to map the at least one virtual address of the request to a corresponding at least one physical address. Then, using the mapped physical address, the non-volatile write control module 128 performs (at 306) the requested write to the non-volatile memory 124 to update the content of the non-volatile memory 124.

In some embodiments, a synchronization mechanism can be provided to control updates of content of the non-volatile memory 124 if multiple guest operating systems issue requests to update the non-volatile memory 124.

Instructions of software described above (including the VMM 120, guest operating systems 104A, 104B, and BIOS routine 118 of FIG. 1) are loaded for execution on a processor (such as one or more CPUs 112 in FIG. 1). The processor includes microprocessors, microcontrollers, processor modules or subsystems (including one or more microprocessors or microcontrollers), or other control or computing devices. A "processor" can refer to a single component or to plural components (e.g. one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of managing requests of a plurality of guest operating systems that coexist in a computer system, comprising:

receiving, by a coordinator in the computer system, a request from one of the plurality of guest operating systems to invoke a service of an actual basic input/output system (BIOS) routine in the computer system, wherein the plurality of guest operating systems execute in respective virtual machines of the computer system, wherein the virtual machines contain respective virtual BIOS routines, and wherein receiving the request comprises receiving the request of a particular one of the virtual BIOS routines that has been trapped by a virtual machine monitor; and managing, by the coordinator, processing of the received request to invoke the service to prevent a conflict from occurring with respect to at least another one of the plurality of guest operating systems.

2. The method of claim 1, wherein managing the processing of the received request is performed by the coordinator that is part of the virtual machine monitor.

3. The method of claim 1, further comprising:
in response to detecting that the conflict will occur, the coordinator causing the virtual machine monitor to simulate the service for the virtual machine that contains the particular virtual BIOS routine.

4. The method of claim 3, further comprising:
in response to detecting that the conflict will not occur, the coordinator causing the virtual machine monitor to call the actual BIOS routine to perform the service.

5. The method of claim 1, wherein receiving the request to invoke the service of the actual BIOS routine comprises receiving the request to invoke a power management service to change a power mode of the computer system.

6. The method of claim 5, wherein receiving the request to invoke the power management service to change the power mode of the computer system comprises receiving the request to invoke an Advanced Configuration and Power Interface (ACPI) power management service.

7. The method of claim 1, further comprising:
receiving a second request to update content of a non-volatile integrated circuit (IC) memory, wherein the second request contains at least one virtual address;
mapping the at least one virtual address to at least one physical address of the non-volatile IC memory; and
updating the content of the non-volatile IC memory using the at least one physical address.

8. The method of claim 1, wherein receiving the request to invoke the service comprises receiving the request to invoke a thermal management service to change a state of the computer system in response to a detected temperature.

9. The method of claim 1, wherein receiving the request to invoke the service comprises receiving the request to invoke a hot-swap service to manage hot insertion of a device into the computer system or hot removal of a device from the computer system.

10. A method of managing requests of a plurality of operating systems that coexist in a computer system, comprising:
receiving, by a coordinator in the computer system, a request from one of the plurality of operating systems to invoke a service of a management routine in the computer system, wherein the plurality of operating systems execute in respective virtual machines of the computer system, wherein receiving the request to invoke the service of the management routine comprises receiving the request to invoke a thermal management service to change a state of the computer system in response to a thermal event, or receiving the request to invoke a service relating to hot-swapping a peripheral device in the computer system; and managing, by the coordinator, processing of the received request to invoke the service of the management routine to prevent a conflict from occurring with respect to at least another one of the plurality of operating systems.

11. The method of claim 10, further comprising:
in response to the request, detecting a state of the at least another one of the plurality of operating systems; and
determining if a conflict will occur based on the detected state.

12. The system of claim 11, further comprising a virtual machine monitor containing the coordinator, wherein the action includes causing the virtual machine monitor to simulate the requested service for the virtual machine containing the guest operating system that sent the call.

13. A computer system comprising:
a processor;
a plurality of virtual machines that contain respective guest operating systems and respective virtual basic input/output system (BIOS) routines;
an actual BIOS routine executable on the processor; and
a coordinator executable on the processor to:
detect a requested service of one of the virtual BIOS routines responsive to a call from one of the guest operating systems to invoke a service of the actual BIOS routine;
determine if processing of the requested service will conflict with at least another one of the guest operating systems; and
in response to determining that the conflict will occur, perform an action to avoid the conflict.

14. The computer system of claim 13, wherein the requested service includes a thermal management service to change a state of the computer system in response to a detected temperature.

15. The computer system of claim 13, wherein the requested service includes a hot-swap service to manage hot insertion of a peripheral device into the computer system or hot removal of a peripheral device from the computer system.

* * * * *

UNITED STATES PATENT AND TRADEMARK OFFICE
CERTIFICATE OF CORRECTION

PATENT NO. : 8,166,288 B2
APPLICATION NO. : 12/362598
DATED : April 24, 2012
INVENTOR(S) : Jose A. Sancho-Dominguez et al.

It is certified that error appears in the above-identified patent and that said Letters Patent is hereby corrected as shown below:

In the Claims

In column 7, line 10, in Claim 12, delete "system" and insert -- method --, therefor.

Signed and Sealed this
Sixteenth Day of April, 2013

Teresa Stanek Rea
*Acting Director of the United States Patent and Trademark Office*